April 7, 1959 — B. BARÉNYI ET AL — 2,880,444
WINDSHIELD WIPERS FOR MOTOR VEHICLES
Filed Nov. 15, 1952

Inventors:
Béla Barényi
Karl Wilfert
By: Dicke and Padlon
Attorneys

United States Patent Office 2,880,444
Patented Apr. 7, 1959

2,880,444

WINDSHIELD WIPERS FOR MOTOR VEHICLES

Béla Barényi, Stuttgart-Rohr, and Karl Wilfert, Stuttgart-Degerloch, Germany, assignors to Daimler-Benz Aktiengesellschaft, Stuttgart-Unterturkheim, Germany Application November 15, 1952, Serial No. 320,801

Claims priority, application Germany November 17, 1951

4 Claims. (Cl. 15—253)

The present invention relates to an arrangement of windshield wipers in vehicles, particularly in motor vehicles, and relates to the construction of the vehicle covering or body in combination with the windshield wipers.

With windshield wipers for use in motor vehicles having oscillating wiper arms hitherto known, the fulcrum was usually arranged closely above or below the windshield. The driving shaft of the wiper arm passed through the covering or body either at the upper transverse bar or at the lower windshield frame and extended from the wiper drive located within the vehicle covering to the outside thereof.

It has already been suggested to arrange the fulcrum of the wiper arm in a cavity of the vehicle hood with the driving shaft located at the bottom thereof. However, with such a cavity there exists the risk that the water and snow which collect therein may freeze during winter.

The hitherto known windshield wipers with oscillating wiper arms, which are commonly used today, apart from other disadvantages, have the further disadvantage that the fulcrum and the lower part of the wiper arm impair the vision of the driver. Moreover, the windshield wiper when out of action, i.e., when in its normal rest position, is permanently visible and thereby impairs the vision of the driver.

Windshield wipers are also known which possess wiping blades reciprocating vertically and horizontally.

However, all the hitherto known windshield wipers offer the disadvantage that during winter the snow cannot be removed sufficiently. Moreover, the operation of the windshield wiper is hampered by the snow which collects more and more on the vehicle covering or hood near the window so that the windshield wiper will finally stop to operate.

A further disadvantage of the oscillating type windshield wipers lies in the fact that the angle of deflection of the wiper arm is very limited, whereby the vision of the driver is equally limited and the driving safety is impaired.

An object of the present invention resides in the provision of an arrangement to remove efficiently the rain and snow water from the windshield of a motor vehicle.

Another object of the present invention is to provide a windshield wiper which permits removal of rain and snow water from the covering.

Still another object of the present invention is the provision of a windshield wiper arrangement which improves the vision in motor vehicles.

A further object in accordance with the present invention resides in the construction of a windshield wiper by extending the windshield or its lower frame to the gap formed in the hood covering and by removing the snow or rain water by means of the windshield wiper into the gap which begins at the windshield. For this purpose, the gap must have an appropriate width. For purposes of removing the rain water and the snow, a canal, which is preferably curved and which slopes toward the outside of the vehicle, is arranged below the gap at a certain depth. The rain or snow water which reaches the gap will then flow off in the canal toward either side of the vehicle.

As a result of the present invention, it is also possible to obtain a larger wiping area than with hitherto known windshield wipers which area will be the same even during winter in heavy snow. The gathering of snow, which would otherwise hamper the operation of the windshield wipers, is reliably avoided by the use of a windshield wiper arrangement in accordance with the present invention.

With a construction of the vehicle in accordance with the present invention in one of its embodiments the angle of deflection of the windshield wiper may be such that the windshield wiper in an end or rest position is about horizontal. This arrangement will also help to remove the rain and snow from the windshield more completely and better than before. Moreover, the windshield wiper in accordance with the present invention will be arranged in its end or rest positions completely below the upper hood covering owing to the mounting thereof within the gap and by reason of the large angle of deflection rendered possible thereby. If the windshield wiper is stopped in one of the end or rest positions when out of action, the windshield wiper is invisible from the inside and the outside of the vehicle. In this manner, the vision of the driver will no longer be impaired when the windshield wiper is stopped. In another embodiment of the invention, the wiper moves up and down on the windshield and in its end or rest position is disposed completely below the upper hood covering.

The length of the gap provided in the hood covering in front of the windshield is at least equal to the width formed by the angle of deflection of the windshield wipers. In order to provide for proper flowing or draining of the rain water and of the snow, which may fall on the windshield laterally with respect to the wiping area of the windshield, by way of the gap and the canal arranged in the gap, the gap may be extended the entire width of the vehicle and may be constructed to gradually narrow toward the longitudinal sides of the vehicle or may be constructed of constant width up to the longitudinal sides of the vehicle.

Further objects and advantages of the present invention will become more obvious from the following description when taken in connection with the accompanying drawing which shows for purposes of illustration only several preferred embodiments in accordance with the present invention, and wherein.

Figure 3:
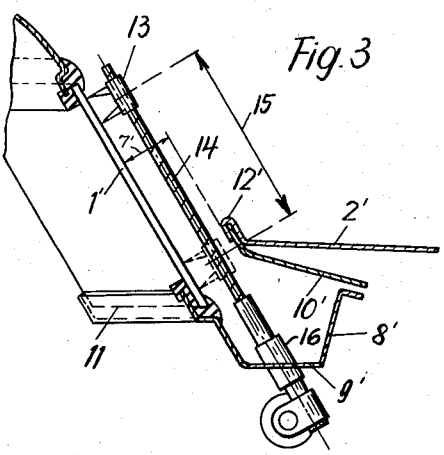
Figure 4:
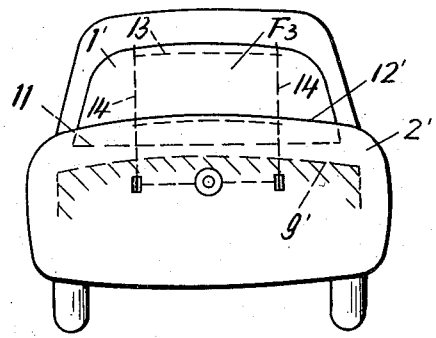

Figure 3 is a cross sectional view through the windshield and through a part of the front hood covering of a motor vehicle and through a projection of the windshield wiper of a further embodiment in accordance with the present invention wherein the windshield wiper is provided with wiper blades moving up and down, and Figure 4 is a front view of a passenger motor vehicle, on a smaller scale, showing the windshield wipers in accordance with the present invention of Figure 3.

Figure 1:
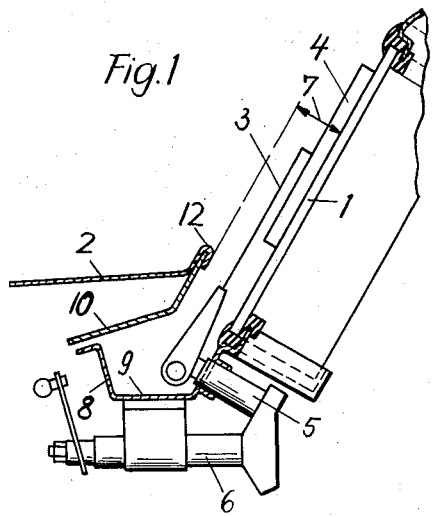
Figure 1 is a cross sectional view through the windshield of a motor vehicle and through a part of the front hood covering and the projection of the windshield wiper and driving elements associated therewith.
Figure 2:
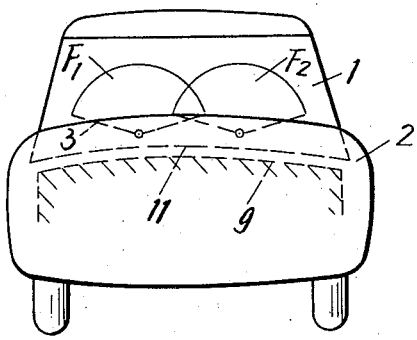
Figure 2 is a front view of a passenger motor vehicle, on a smaller scale, with the windshield wiper according to the present invention shown in Figure 1.

Referring now to the drawing, and more particularly to Figures 1 and 2, reference numeral 1 designates the windshield of a passenger motor vehicle, which includes a front hood covering 2. The arm 3 of the oscillating windshield wiper, which carries the wiper blade 4 made of rubber, is securely connected with a shaft located in casing or bushing 5 and is driven by an intermediate oscillating shaft housed in casing or bushing 6 by means of gear wheels, friction wheels and the like. The intermediate shaft is driven from an electric motor by means of a conventional arrangement which converts the rotary motion of the electric motor into reciprocating motion of the intermediate shaft.

According to the present invention, a wide gap 7 is provided between the windshield 1 and the hood covering 2. Below gap 7, a canal 8 is provided in the construction illustrated in Figures 1 and 2, which is located below the support of the wiper arm 3 and which includes a deflecting surface 9 for the rain or snow water which collects in the canal 8. A covering sheet metal is firmly retained above the canal 8 by the bordered end of the sheet metal of the hood covering 2 which, at that point, extends upwardly a short distance.

In the embodiment illustrated herein, the windshield is of such width and so arranged as to extend with its lower end into the gap 7. Of course, the windshield 1 need not be in every case extended as far as the bottom, as illustrated in Figure 1, but might preferably also terminate in the hood covering, while the windshield wiper preferably extends to a point adjacent the sheet metal of the windshield frame which passes along the bottom rim of the windshield. For purposes of operating the windshield wiper it is suitable to arrange the bottom edge 11 of the windshield 1 below the edge 12 of the hood covering 2 and above the deflecting surface 9 of the canal 8. The upper edge of the hood covering 2 and the deflecting surface 9 of the canal 8 are curved toward the bottom in the transverse direction of the vehicle, whereas the lower edge 11 of the windshield 1 may be straight or may also be curved. For ease of manufacture and mounting of the windshield, a substantially straight windshield edge is more convenient.

The characteristic limit lines of the deflecting surface 9, of the lower windshield edge 11 and the upper edge 12 of the hood covering 2 are indicated in Figure 2. The areas covered by the two windshield wipers are designated in Figure 2 with $F_1$ and $F_2$. The wide range of action of the windshield wipers may be readily seen from this figure. In addition, it is to be noted that the windshield wipers lie in their end positions below the upper edge 12 of the hood covering 2.

The modified embodiment according to Figures 3 and 4 differs from the embodiment shown in Figures 1 and 2 substantially only by the arrangement of a windshield wiper of different construction.

The windshield wiper arrangement according to Figures 3 and 4 includes a wiper blade moving up and down. The parts 1', 2', 7', 8', 9', 10', and 12', respectively, correspond to the description of parts 1, 2, 7, 8, 9, 10 and 12 of Figures 1 and 2.

In the embodiment of Figures 3 and 4, the wiper blade, which moves up and down, is operated by means of a threaded spindle 14 arranged in the gap 7' and provided with an external screw thread of relatively large pitch. The spindle 14 is received in a bearing 16 located beneath the terminal portion of hood 2. The stroke of the wiper blade 13 is indicated by dimension 15. In its lower end or rest position, the wiper blade is within gap 7'. By reason of the downward movement of the wiper blade 13, the rain water hitting the windshield 1 or the snow collecting thereon is removed downwardly and conducted into the gap 7' and the canal 8' disposed therein.

At the top frame of the windshield 1 an edge, which may be the lower edge of the top molding shown in Figures 1 and 3, may be provided thereat for loosening or detaching the snow from the windshield 1 which had been carried up to the top by the windshield wiper blade 13 during its upward movement so that the snow detaches itself from the windshield 1 as well as from the frame of the windshield at the top thereof, and then falls back into the gap 7'.

Figure 4 illustrates the area $F_3$ covered by the wiper blade 13. The particularly characteristic lines 9', 11 and 12' are shown in this figure, in which the bottom edge 11 of the windshield 1' proceeds substantially straight.

We claim:

1. In a motor vehicle having a vehicle body with a transversely extending window pane and with an external vehicle covering having a terminal portion in front of said window pane and spaced therefrom to provide a gap between said window pane and said portion, said gap extending transversely in parallel relationship with said window pane over the entire width thereof, a wiper mounted for oscillatory movement along said window pane and having a rest position in which said wiper extends substantially horizontally below said terminal portion, drive means for imparting said oscillatory movement to said wiper, and for pivoting said wiper to said rest position, pivot means for said wiper, said pivot means being located below said terminal portion so that said wiper when pivoted to said rest position will be below said terminal portion, said rest position being located in said gap above the lower edge of said window pane, said window pane being unobstructed directly above said rest position whereby said wiper is free to move in contact with said window pane to said rest position.

2. The combination according to claim 1, wherein a rigidly built-in canal is located below the entire width of said gap, the bottom of said canal sloping downwardly toward the outside of said vehicle.

3. In a motor vehicle having a vehicle body with an inclined transversely extending window pane and with an external vehicle covering having a terminal portion in front of said window pane and spaced therefrom in order to provide a gap between said window pane and said portion, said gap extending transversely in parallel relationship with said window pane over the entire width thereof, a wiper mounted for reciprocatory movement along said window pane, said wiper having a rest position in said gap below said terminal portion and above the lower edge of said window pane, means for imparting said reciprocatory movement to said wiper and for moving said wiper into said rest position, said means including spindle means positioned transversely of the upper and lower edges of said window pane, said spindle means being received in bearing means located beneath said terminal portion, said window pane being unobstructed directly above said rest position whereby said wiper is free to move in contact with said window pane to said rest position, and a rigidly built-in canal located below the entire width of said gap.

4. The combination according to claim 3, in which said spindle means comprises two spindles extending through said gap, said spindles being provided with screw threads of a large pitch for reciprocating said wiper upon rotation of said spindles.

References Cited in the file of this patent

UNITED STATES PATENTS

| 1,052,637 | Woodstrom | Feb. 11, 1913 |
| 1,847,802 | Wilson | Mar. 1, 1932 |
| 1,869,551 | Earl | Aug. 2, 1932 |
| 2,271,225 | Heffernan | Jan. 27, 1942 |

FOREIGN PATENTS

| 8,247 | Australia | July 12, 1927 |
| 933,104 | France | Dec. 17, 1947 |